(12) United States Patent
Lawson et al.

(10) Patent No.: US 11,637,934 B2
(45) Date of Patent: Apr. 25, 2023

(54) SYSTEM AND METHOD FOR MONITORING ACCOUNT USAGE ON A PLATFORM

(71) Applicant: Twilio Inc., San Francisco, CA (US)

(72) Inventors: Jeffrey G. Lawson, San Francisco, CA (US); John Wolthuis, San Francisco, CA (US); Evan Mansfield Cooke, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/704,681

(22) Filed: Dec. 5, 2019

(65) Prior Publication Data
US 2020/0112641 A1    Apr. 9, 2020

Related U.S. Application Data

(63) Continuation of application No. 15/419,796, filed on Jan. 30, 2017, which is a continuation of application (Continued)

(51) Int. Cl.
*H04M 15/00* (2006.01)
*H04L 12/14* (2006.01)
*H04W 4/24* (2018.01)

(52) U.S. Cl.
CPC ........ *H04M 15/77* (2013.01); *H04L 12/1403* (2013.01); *H04L 12/1446* (2013.01); *H04M 15/8278* (2013.01); *H04W 4/24* (2013.01)

(58) Field of Classification Search
CPC .............. H04M 15/77; H04M 15/8278; H04L 12/1403; H04L 12/1446; H04W 4/20; H04W 4/24
See application file for complete search history.

(56) References Cited

U.S. PATENT DOCUMENTS 5,274,700 A   12/1993   Gechter et al.
5,526,416 A   6/1996    Dezonno et al.
(Continued)

FOREIGN PATENT DOCUMENTS

DE   1684587 A1   3/1971
EP   0282126 A2   9/1988
(Continued)

OTHER PUBLICATIONS

"Aepona's API Monetization Platform Wins Best of 4G Awards for Mobile Cloud Enabler", 4G World 2012 Conference & Expo, [Online], [Accessed Nov. 5, 2015], Retrieved from the Internet: <URL: https://www.realwire.com/releases/%20Aeponas-API-Monetization>, (Oct. 30, 2012), 4 pgs.
(Continued)

*Primary Examiner* — Steven S Kelley
(74) *Attorney, Agent, or Firm* — Schwegman Lundberg & Woessner, P.A.

(57) ABSTRACT

A system and method for monitoring account usage on a platform that includes creating an account on a platform; assigning a usage model of the account; running an application of the account on the platform; monitoring usage of the application of the account; identifying a usage event of the usage model in the monitored usage; and generating an event response based on the usage event.

18 Claims, 12 Drawing Sheets

Related U.S. Application Data

No. 13/167,569, filed on Jun. 23, 2011, now abandoned.

(60) Provisional application No. 61/357,940, filed on Jun. 23, 2010.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |

(56) References Cited

U.S. PATENT DOCUMENTS

| | | |
|---|---|---|
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,204,281 B2 | 12/2015 | Ramprasad et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,456,339 B1 | 9/2016 | Hildner et al. |
| 9,596,274 B2 | 3/2017 | Lawson et al. |
| 9,628,624 B2 | 4/2017 | Wolthuis et al. |

(56) References Cited

U.S. PATENT DOCUMENTS

| | | |
|---|---|---|
| 9,632,875 B2 | 4/2017 | Raichstein et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0125023 A1* | 7/2003 | Fishier .................. H04L 67/04 455/426.1 |
| 2003/0149721 A1 | 8/2003 | Alfonso-nogueiro et al. |
| 2003/0162506 A1 | 8/2003 | Toshimitsu et al. |
| 2003/0185360 A1* | 10/2003 | Moore ................ H04L 65/1069 379/114.01 |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0232616 A1* | 12/2003 | Gidron .................. H04M 15/00 455/406 |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1* | 5/2004 | Reith .................. H04M 15/68 455/410 |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishier |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |

(56) References Cited

U.S. PATENT DOCUMENTS

| | | |
|---|---|---|
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0197188 A1 | 8/2007 | Sprigg et al. |
| 2007/0197189 A1* | 8/2007 | Horel .................. H04M 15/43 455/406 |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 1/2009 | Babaev |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |

(56) References Cited

U.S. PATENT DOCUMENTS

| | | |
|---|---|---|
| 2011/0176537 A1 | 7/2011 | Lawson et al. |
| 2011/0179126 A1 | 7/2011 | Wetherell et al. |
| 2011/0191826 A1* | 8/2011 | Ballal .................. H04L 63/104 726/4 |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0037251 A1 | 12/2014 | Fausak et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |

(56) References Cited

U.S. PATENT DOCUMENTS

| | | |
|---|---|---|
| 2016/0239770 A1 | 8/2016 | Batabyal et al. |
| 2017/0142263 A1 | 5/2017 | Lawson et al. |
| 2017/0339283 A1 | 11/2017 | Chaudhary et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 13/167,569, Examiner Interview Summary dated Jul. 21, 2016", 3 pgs.

"U.S. Appl. No. 13/167,569, Examiner Interview Summary dated Sep. 3, 2015", 3 pgs.

"U.S. Appl. No. 13/167,569, Examiner Interview Summary dated Dec. 26, 2014", 3 pgs.

"U.S. Appl. No. 13/167,569, Final Office Action dated May 13, 2015", 19 pgs.

"U.S. Appl. No. 13/167,569, Final Office Action dated Sep. 30, 2016", 15 pgs.

"U.S. Appl. No. 13/167,569, Non Final Office Action dated Apr. 21, 2016", 19 pgs.

"U.S. Appl. No. 13/167,569, Non Final Office Action dated Sep. 18, 2014", 15 pgs.

"U.S. Appl. No. 13/167,569, Response filed Jul. 17, 2016 to Non Final Office Action dated Apr. 21, 2016", 11 pgs.

"U.S. Appl. No. 13/167,569, Response filed Sep. 1, 2015 to Final Office Action dated May 13, 2015", 15 pgs.

"U.S. Appl. No. 13/167,569, Response filed Dec. 18, 2014 to Non Final Office Action dated Sep. 18, 2014", 16 pgs.

"U.S. Appl. No. 15/419,796, Examiner Interview Summary dated Apr. 30, 2019", 3 pgs.

"U.S. Appl. No. 15/419,796, Final Office Action dated Aug. 6, 2019", 14 pgs.

"U.S. Appl. No. 15/419,796, Non Final Office Action dated Dec. 31, 2018", 12 pgs.

"U.S. Appl. No. 15/419,796, Response filed Apr. 30, 2019 to Non Final Office Action dated Dec. 31, 2019", 14 pgs.

"Archive Microsoft Office 365 Email I Retain Unified Archiving", GWAVA, Inc., Montreal, Canada, [Online] Retrieved from the internet: <http://www.gwava.com/Retain/Retain_for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token ring Bridge", Black Box Corporation, [Online] Retrieved from the internet: <http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the internet: <http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online], Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

\* cited by examiner

SYSTEM AND METHOD FOR MONITORING ACCOUNT USAGE ON A PLATFORM

CROSS-REFERENCE TO RELATED APPLICATIONS

This application is a continuation of U.S. patent application Ser. No. 15/419,796, filed 30 Jan. 2017, which is a continuation of U.S. patent application Ser. No. 13/167,569, filed 23 Jun. 2011, which claims the benefit of U.S. Provisional Application No. 61/357,940 filed 23 Jun. 2010, all of which are incorporated in their entirety by this reference.

TECHNICAL FIELD

This invention relates generally to the platform as a service field, and more specifically to a new and useful method for monitoring account usage on a platform in the platform as a service field.

BACKGROUND

In recent years, numerous new platform-as-a-service product offerings have appeared. Many of these platforms require creating an account, and sometimes when another product is leveraging the platform this account may have subaccounts. Thus, in the use of an application there may be numerous involved entities such as an account holder, a sub-account holder, a platform as a service entity, and a client. Additionally, such ecosystems sometimes require payment to be exchanged between parties, but the complicated relationships between the different parties make carrying out such payments cumbersome and difficult. In some cases, such complications prevent certain products from being viable. In particular, telephone and telephony messaging services are becoming more integrated with web-based applications. Many of these services are built on telephony application platforms. To build an application on the telephony application often requires creating an account with the telephony application platform. Because of the resources required to operate a telephony application platform, accounts often have to pay for a usage plan. This complicates the development and distribution options of application developers when trying to sell their applications/services built on top of a telephony application platform. Each customer of a developer impacts the amount of resources used on the telephony application platform, and thus impacts which usage plan for the developer is most appropriate. Not only must an application developer charge a customer for use of their application but the developer must also interface with the telephony application platform. Thus, there is a need in the platform as a service field to create a new and useful system and method for monitoring an account on a platform. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Monitoring an Account on a Platform

Figure 1:
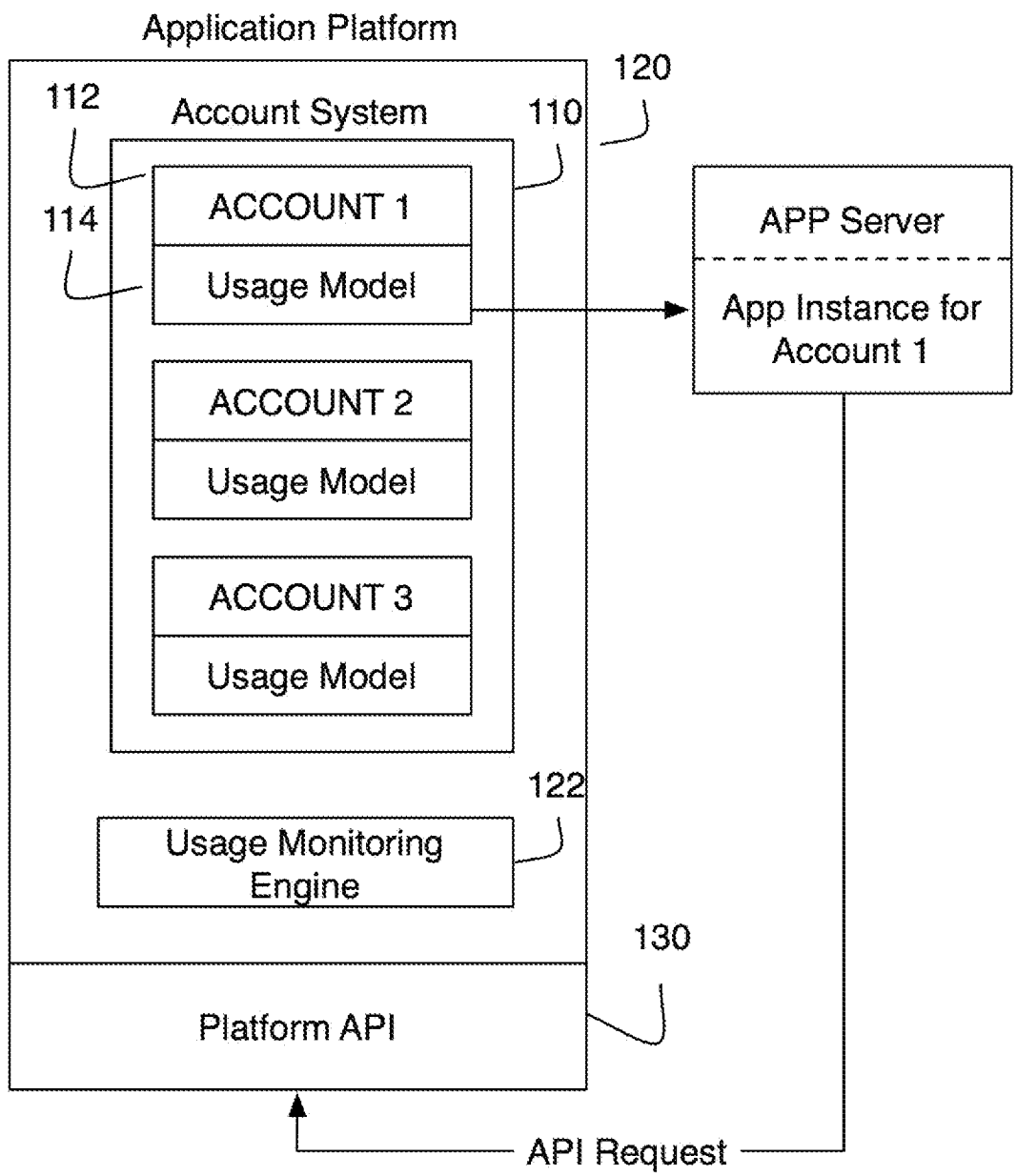
FIGS. 1 and 2 are a schematic representations of systems of preferred embodiments.

As shown in FIG. 1, a system for monitoring an account on a platform of the preferred embodiment includes an account system no with at least one account resource 112 with a usage model 114; an application platform 120, that includes a usage monitoring engine 122; and a platform application programming interface (API) 130. The system functions to allow usage triggered processing to occur for applications of an account. The system enables customized application behavior specific for an account. The system has particular application to a computing platform utilized by application developers that create application instances for users. Additionally the system may be designed for an account system with parent accounts that have a plurality of sub-accounts. In this variation, the system enables a reseller system where developers can seamlessly distribute telephony applications to customers (i.e., sub-accounts) while using resources of a computing platform. The system preferably enables a partitioning of usage, where account usage (or sub-accounts in some variations) is preferably tracked and treated independently from other accounts. In one preferred embodiment, the system is applied to a telephony application platform. The system can preferably be used to offer a reseller environment where a company can develop an application on top of a telephony application platform 110 and sell that to end users. The system may alternatively be used for any suitable application.

Figure 2:
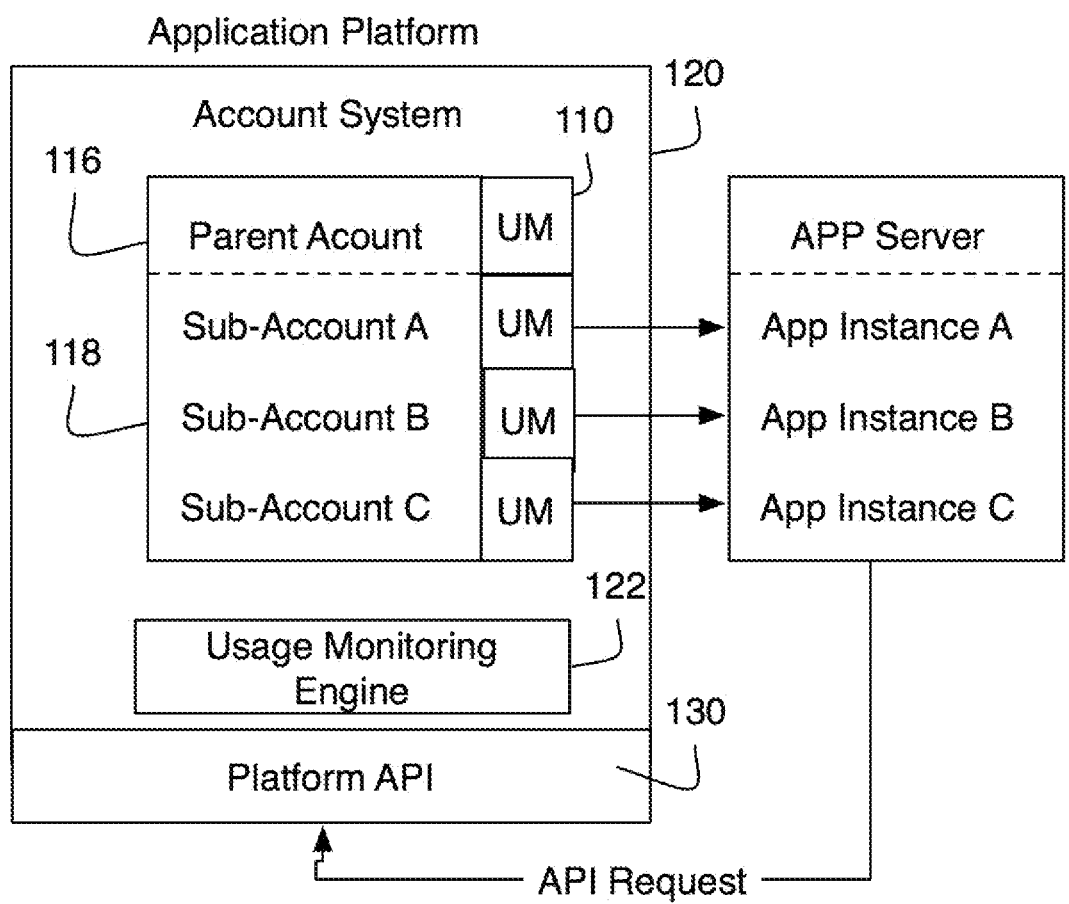

The account system 110 of the preferred embodiment functions to manage account resources with application instances run on the application platform 120. The account system preferably includes a plurality of accounts 112. An account 112 preferably has an accessible interface for outside control of functionality within the application platform 120. Each account preferably has an associated application and a usage model 114. In some variations the application may be thought of as an account, For example, obtaining an application from an application store implicitly creates a usage model account for that application instance. A usage model 114 for the account preferably determines the pricing for use of the application platform 120, but may alternatively be for any usage-based behavior such as logging. A usage model can preferably be used to specify usage event parameters. For example, setting a usage model of 1000 minutes of application session use for an agreed upon price will preferably set a usage event parameter of 1000 minutes. The usage event parameter is used to determine when a usage event is triggered. An instance of an application is preferably devoted to use by the account or a sub-account. The instance of the application preferably has a separate endpoint associated with the application instance of the account resource 112. If the application has any settings or configuration, the application instance preferably has customized settings or configuration. Alternatively, the account system 110 may include parent accounts 116 with a plurality of sub-accounts 118 as shown in FIG. 2. The sub-accounts 118 preferably function substantially similar to the accounts 112 discussed above except a parent account may control aspects of the application instance and/or setting of the usage model 114. A parent account and a sub-account may both have a usage model 114. The account resource 112 and/or parent accounts 116 and sub-accounts 118 are preferably created, retrieved, updated, deleted, or manipulated in any suitable way through the platform API, more preferably a representational state transfer (REST) API.

A parent account resource 116 is preferably created when an application developer signs up for or registers for an account on the application platform 120. A parent account resource is preferably a high level account that configures applications for a plurality of other accounts (i.e., sub-accounts). The parent account may set the usage model between the application developer and the application platform operator. When the usage events are used for billing the difference between the usage model of the parent account and the sub-account preferably determines the cost or profits of the parent account entity. While the usage model of the parent account determines the revenue of the application platform. A parent account resource 116 is preferably created through a web interface, but a parent account may alternatively be created programmatically through the platform API 130. The parent account resource 116 is preferably a data store of settings for the parent account. The parent account resource 116 is preferably used to manage configuration of an application such as the URI of an application, usage model (e.g., pricing for usage), usage amounts, billing information, and/or any suitable setting of the parent account. The usage model for the parent account resource 116 is preferably determined by the application platform provider. The parent account resource 116 preferably includes at least one sub-account resource 118. The sub-account resource 118 is preferably used by an application developer to configure operation of a sub-account within the account.

The sub-account resource 118 of the preferred embodiment functions as an instance of an application of the parent account. The sub-account resource 118 is preferably a data store of settings for the sub-account. A usage model 114 for the parent account 116 preferably determines the pricing for use of the main account application. In other words, the usage model for the sub-account is preferably for use by a customer of both the telephony application platform and the application/service of the account holder. For example, a company selling a telephony based product such as a phone tree to route callers to different departments may have an account on a telephony application platform. The company will preferably have a plurality of sub-accounts for customers using the phone tree product. Each sub-account will preferably have customized settings to determine where to route calls. There may additionally be numerous applications provided by the account holder so that sub-accounts may have a completely different application from another sub-account holder.

The application platform 120 of the preferred embodiment functions to provide the application processing functionality for an application. The application platform is preferably a platform as a service computing platform. The application is preferably remotely hosted at a URI, but the application may alternatively be stored or hosted within the application platform. The application platform is preferably a telecommunications platform and more preferably a telephony application platform, but may alternatively be any suitable platform, such as a media processing platform, an analytics platform, a storage/processing platform or any suitable platform. A telecommunications platform may involve application use of voice, video, or messaging communication. The telephony application platform 110 of the preferred embodiment functions to provide core functionality of a telephony application. A telephony application preferably incorporates interaction between a web application and a telephone network. A telephony application platform 110 may additionally or alternatively support application integration with a telephony messaging network such as short message short message service (SMS) or multimedia messaging service (MMS), fax, email, video, and/or any suitable network. The telephony application platform preferably includes the hardware such as a call router and/or software stacks required to operate a telephony application. The telephony application platform 110 is preferably substantially similar to the platform described in U.S. patent application Ser. No. 12/417,630, filed on 2 Apr. 2009 and entitled "System and Method for Processing Telephony Sessions", which is incorporated in its entirety by this reference, but may alternatively be any suitable telephony platform.

The application platform 120 preferably includes a usage monitoring engine 122, which functions to monitor and detect usage events of a usage model. The usage monitoring engine preferably runs in the background on the application platform 120 during normal operation. The usage events are preferably time based, but may alternatively be a pattern of execution in an application or any suitable detectable event of an application. A usage event dependent on time based parameters may depend on a time rate parameter (e.g., $0.10/min). In the example where there is a per minute charge, if funds are reached or a particular total amount is reached then a usage event occurs. A usage event dependent on time base parameters may alternatively depend on a time span of allowed usage. For example, a usage may be allowed for a month. When the end of that time span is reached or approaches neat, a usage event may occur. A usage event that is dependent on data-use parameter is another alternative. Data-use is preferably a count related to the application. Data-use may include the amount of data transferred, the number of messages sent, the number of sessions, or any suitable data related parameter. The usage monitoring engine 122 preferably detects a usage event and then triggers a change in the application platform (i.e., redirects) to communicate with a routine to handle the event. The application platform 120 may additionally include a billing engine that manages billing and calculation of appropriate transactions to occur between account holders and the application platform operators. In particular, the billing engine calculates the appropriate transactions with a parent account holder which includes the sum total of usage of all sub-accounts based on the usage model of the parent account offset by sum total of usage of all sub-accounts based on the usage model of the individual sub-accounts.

The platform application programming interface (API) 130 of the preferred embodiment functions to provide a programmatic way to interface with a account resource 112 of the account system no. The platform API can preferably create, read, update, delete or perform any suitable manipulation to parameters of an account resource 112. The platform API can preferably allocate new sub-account resources 118, setup an instance of an application for a sub-account, assign a phone number or allocate a new phone number for an account or sub-account, retrieve usage of an account, set a usage model/pricing of an account, parent account and/or sub-account, perform any suitable interaction with resources of the telephony application platform. The platform API 120 is preferably a REST API but any suitable API may alternatively be used such as a simple object access protocol (SOAP). An account holder can preferably programmatically interface with the account resource 112 through the platform API. The resources are preferably accessible with the API through an outside channel, but may alternatively be an internal programming interface for applications running within the platform. Similarly a parent account holder can preferably interface with the parent account resource 116 and sub-account resources 118 through the platform API. This preferably allows for more integration between an application of an account holder and the application platform 120, rather than requiring an account holder to manually create accounts through a web interface or have the application of the account reside within the application platform 120, though those options may alternatively be available. For example, an application of a parent account holder may have a new customer signup for a phone tree product. The customer may signup through an outside website operated by the parent account holder. The website of the account holder preferably initiates a REST API request to access the parent account resource 116 of the parent account holder and add a sub-account resource 118 for the new customer. A new phone number may be dynamically assigned for the sub-account resource, and the website of the parent account holder can preferably request the new phone number using the REST API, and then inform the customer of the new phone number. The customer preferably never has to be bothered with interfacing with the telephony application platform 110.

2. Method for Monitoring an Account on a Platform

Figure 3:
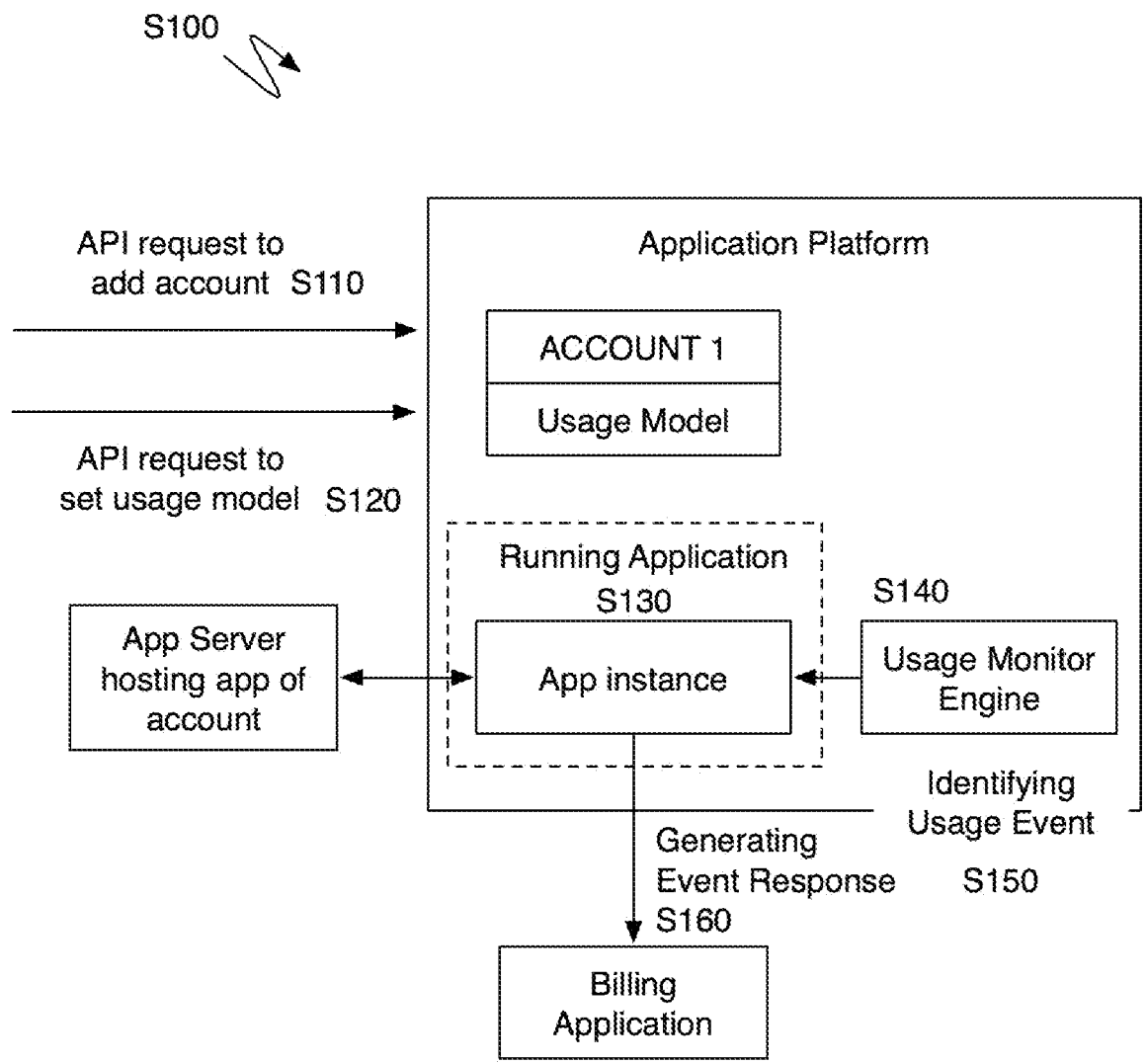
FIG. 3 is a schematic representation of a method of a preferred embodiment.

As shown in FIG. 3, a method S100 for monitoring an account on a platform of a preferred embodiment includes creating an account on a telephony application platform S110, assigning a usage model to the account S120, running an application of the account on the platform S130, monitoring usage of the application of the account S140; identifying a usage event of the usage model in the monitored usage S150; and generating an event response based on an event of the usage model S160. The method functions to enable performing account specific tasks based on usage by the account. In one embodiment, the method is applied to enable accounts to have billing tasks performed. The method may additionally function to enable developers of applications to customize behavior of an application on a platform and may further customize the monitoring and behavior based on the account holder of an application. In one example, a developer of an application may set up the redirection of an application to trigger billing of the account holder. In another example, a developer of an application may set up the redirection of an application to send a notification to an account holder which may be used for billing reminders, usage warnings, usage logging, or any suitable application. The method is preferably implemented for a telephony platform. The telephony platform preferably enables telephony with integration to voice communication, a telephony messaging service (e.g., SMS or MMS), fax, email, or any suitable network. The method may alternatively be applied to any suitable computing platform. As an additional alternative, the method may be configured to function with parent accounts and sub-accounts as described below in method S200.

Figure 4:
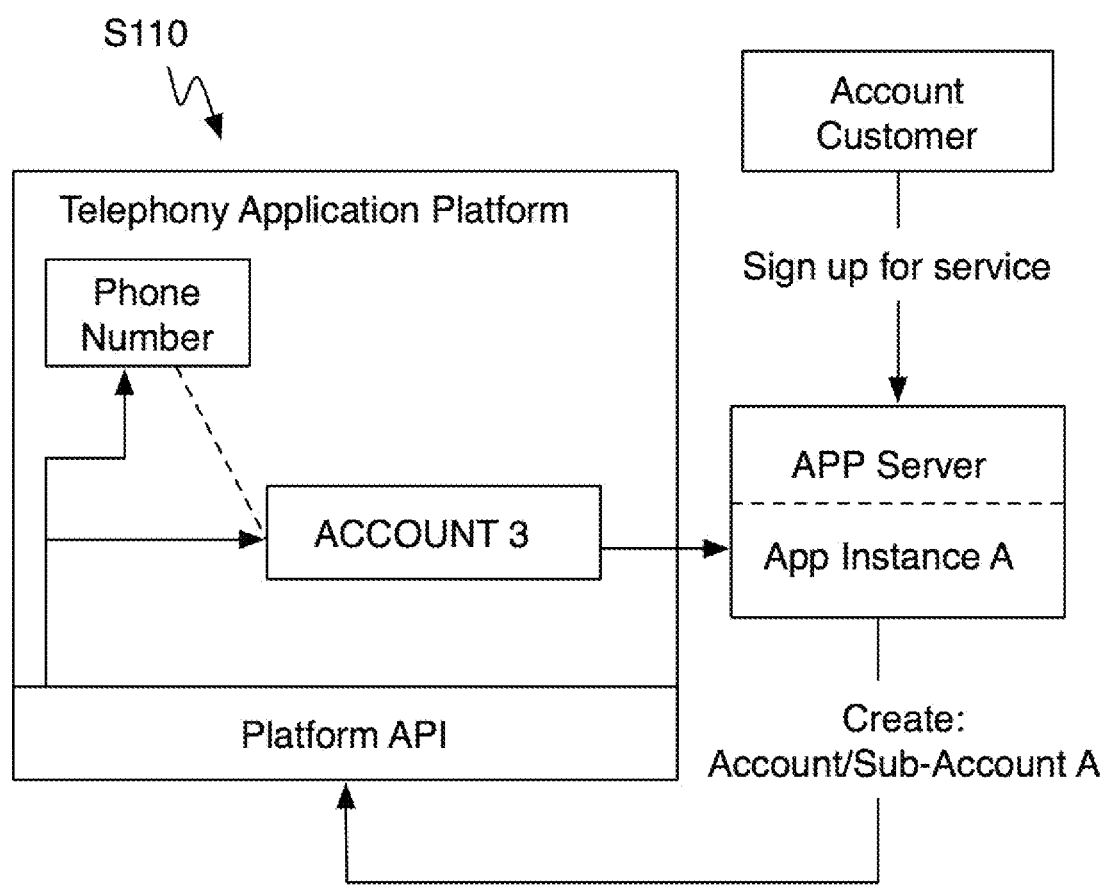
FIG. 4 is a detailed schematic representation of defining a unique mapping between an application of an account a platform endpoint of a preferred embodiment.

Step S110, which includes creating an account on a telephony application platform, functions to create an instance of an application for use by an account holder. As shown in FIG. 4, an account preferably defines a unique mapping between an application of the account and a platform endpoint. The platform endpoint is preferably any suitable addressable location. The platform endpoint is preferably a unique endpoint. In one embodiment with a telephony platform, the platform endpoint is a phone number, but may alternatively be a SMS short code, fax number, email, or any suitable telephony address. In one variation, the phone number may be a shared base phone number with an extension. When creating an account, a platform endpoint is preferably assigned to the application of the account. Additionally, step S120 may include allocating a new platform endpoint for use by the account. A pool of unused platform endpoints (e.g., phone numbers) is preferably maintained by the computing platform so that a platform endpoint can be allocated to an account instantly. In one embodiment described in the method S200 below, the account may be configured as a sub-account of a parent account. In this variation, there may be several instances of an application belonging to various accounts, and all these application instances and accounts are created and/or maintained by a parent account. Additionally, application settings of an account are preferably created when creating an account. The application settings may be settings with the computing platform or alternatively settings residing on an application of a parent account. An account is preferably created through the platform API, and more preferably a REST API. The account may alternatively be created in any suitable fashion such as a web-interface. Creating an account through an API may function to allow parent accounts (e.g., customers) to dynamically manage sub-accounts. An account may alternatively be automatically created upon delivering an application to a client. For example, an account (or application associated record) may be created when a client downloads or purchases an application. The application may facilitate the completion of account parameters such as by requiring platform account information or providing a form to acquire the required parameters.

Step S120, which includes assigning a usage model to the account, functions to determine the usage model for an account. The usage model can preferably be based on call session time, number of telephony messages, data access, usage periods (e.g., unlimited for a month), rate limits (e.g., maximum number of simultaneous calls or number of calls per day), or any suitable parameter. A usage model may be fixed for an application (e.g., set by a developer), and a user preferably accepts or rejects the fixed usage model. Actions can preferably be assigned for usage events. Preferably, an action is set by specifying a URI for a redirecting event response. The platform will preferably fetch or message the specified URI when an event occurs. Application logic is preferably included in the resource at the specified URI to perform the suitable action. Alternatively, an application process is specified that can be called when an event occurs. As another variation, various platform-provided actions may be offered to perform a particular type of action. Usage events are preferably stages of usage of an account preferably before a threshold, at a threshold, or after a threshold.

Figure 5:
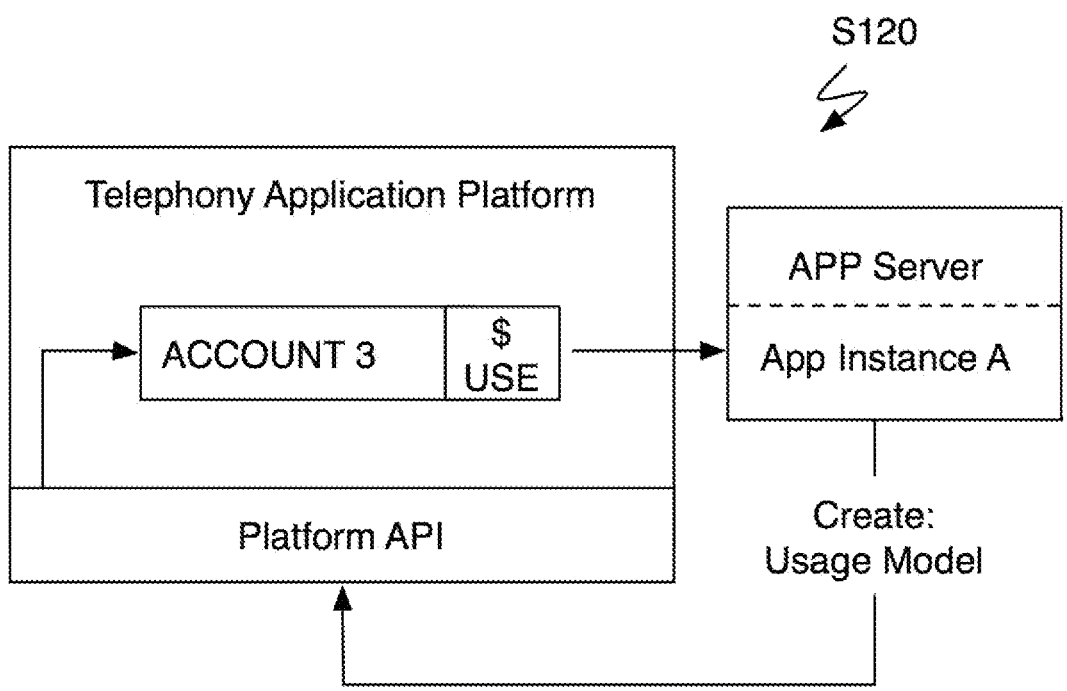
FIG. 5 is a detailed schematic representation of assigning a usage model of a preferred embodiment.

Exemplary usage events preferably include passing a usage limit, approaching a new billing period, or any suitable threshold related to usage. For example, an email notification action may be set to be sent to the account holder five days before a new billing period. The usage model and/or usage events can preferably be manipulated or set through the API, as shown in FIG. 5, but may alternatively be created through a web-interface or through any suitable interface.

Step S130, which includes running an application of the account on the platform, functions to operate the application through the computing platform. Running an application preferably includes communication between an application resource and a system of the platform. Instructions and information are preferably passed back and forth between the application and the computing platform. The application is preferably a remotely hosted resource such as on an application server of a developer. The application preferably resides at a URI to which the platform addresses communications. The application logic may alternatively be stored within the application. An application preferably runs on the platform when the platform is initiated to communicate with the application by an incoming communication addressed to the endpoint assigned to the application. Alternatively, the application server may initiate communication with the computing platform. In a preferred embodiment the computing platform is preferably a telephony platform. Phone calls, SMS messages, MMS messages, faxes or any suitable communication is received by the telephony platform; the telephony platform retrieves instructions from an application based on the endpoint (e.g., phone number) of the received communication; and then the instructions are run on the telephony platform to interact with the entity that send the original communication.

Step S140 and Step S150, which include monitoring usage of the application of the account and identifying a usage event of the usage model in the monitored usage; functions to track at least one parameter necessary to assess the usage model and determine when events relevant to the usage model occur. The monitoring is preferably performed by the platform on behalf of the application. this preferably centralizes the usage event management, alleviating developers of this task. The monitoring of usage keeps track of at least the parameters relating to the usage model. Additional parameters may additionally be tracked. The usage is preferably stored in a log, as attributes of the account, or any suitable manner. The monitoring of usage is preferably a count of usage. For example, the amount of time, number of occurrences (e.g., of using a resource or other actions), amount of data sent, amount of data received, number of API calls, and/or any suitable parameter may be tracked. Additionally or alternatively, the occurrences of isolated events may be monitored. The pattern of operations of an application may be monitored to detect a pattern or a number of various patterns. For example when a particular series of instructions happen and match a specified pattern, a usage event is preferably identified and the application redirected. The monitoring of an application is preferably performed by the computing platform but may alternatively be performed by any suitable system. The usage model preferably determines particular thresholds and/or patterns corresponding to a usage event and that require a redirection of the application. These threshold and/or patterns that correspond to a usage event may be explicitly set in the usage model or may be based on information provided in the usage model. The usage event corresponds to how to redirect an application. While monitoring the usage of the application, the current usage is preferably compared to these thresholds and/or patterns.

Figure 6:
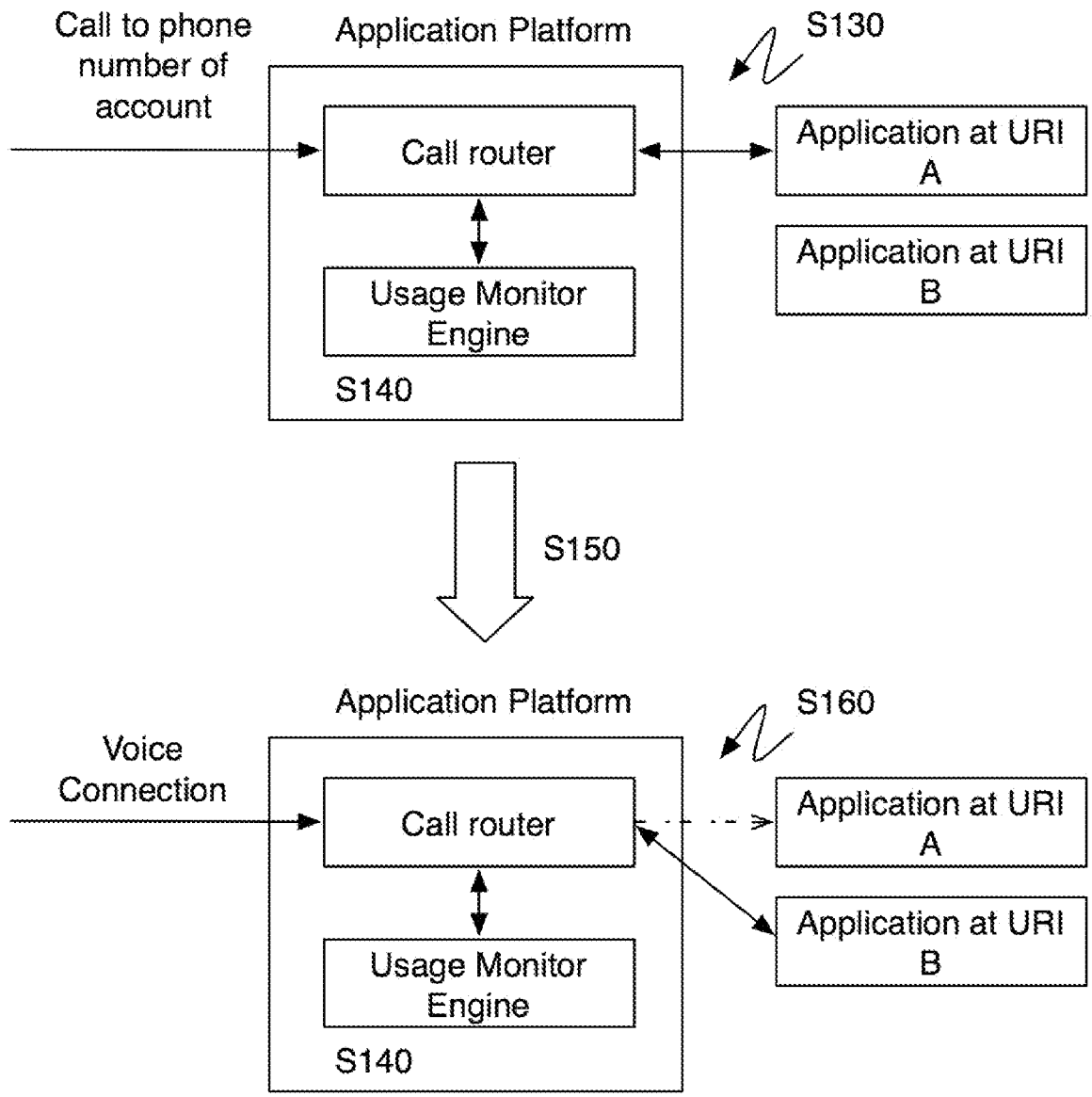
FIG. 6 is a detailed schematic representation of redirecting an application in series with the running of an application of a preferred embodiment.
Figure 7:
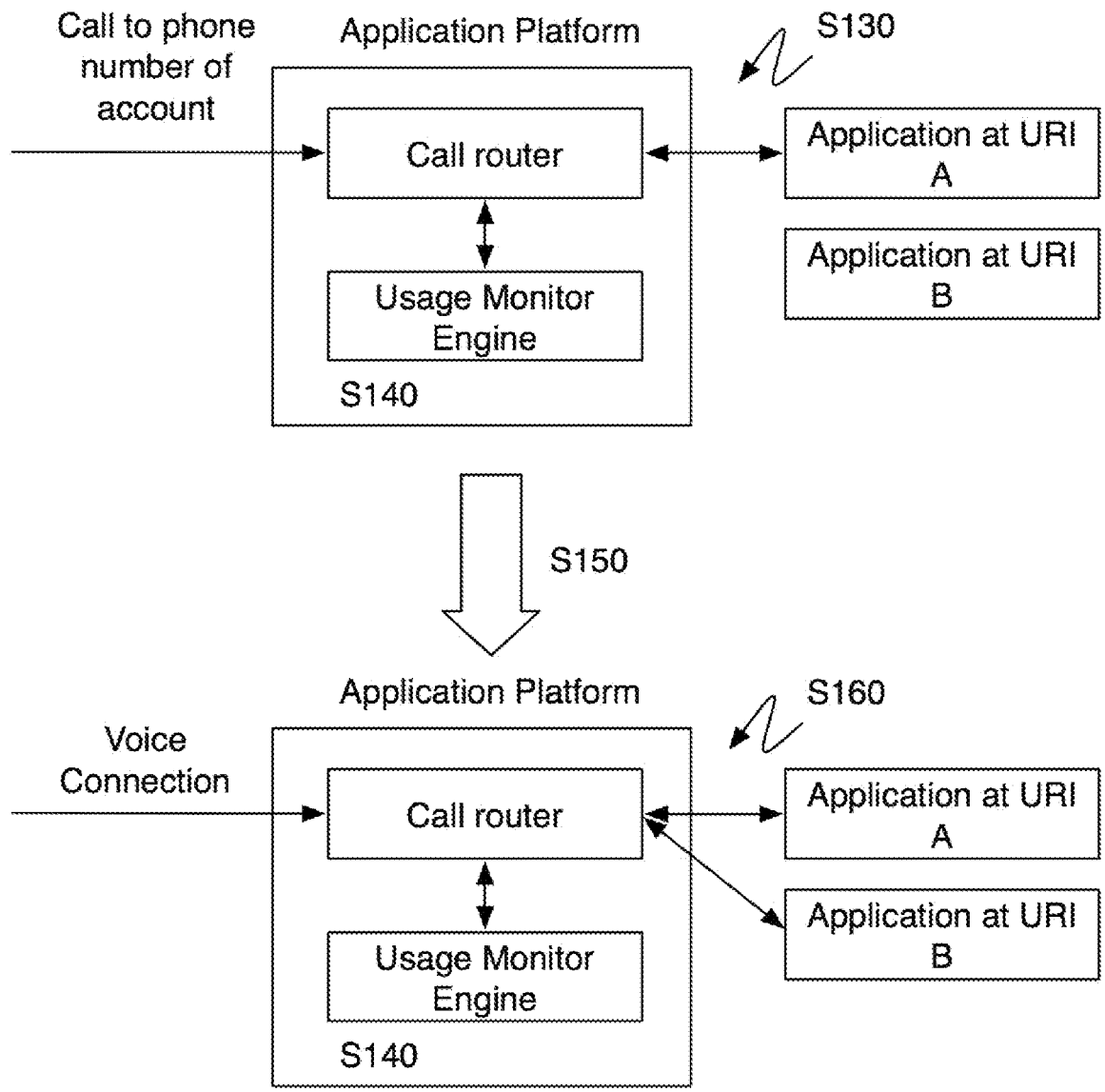
FIG. 7 is a detailed schematic representation of redirecting an application in parallel with the running of an application of a preferred embodiment.

Step S160, which includes generating an event response based on an event of the usage model, functions to perform an action as a result of usage of an application. The generation of an event may be any suitable action. In one preferred variation, the event response is preferably redirecting the application. In a second variation, the event response is preferably ceasing or shutting off usage of the application. This preferably prevents usage of the platform by the application until further actions are taken. This may be accomplished through changing a policy engine, authorization settings, or through any suitable technique. In another variation, the event response is preferably recharging of an account. This may include automatically billing an account, deducting from credit of an account, or through any suitable way. In yet another variation, the event response is preferably the sending of a notification. The notification is preferably sent to the account holder/application owner. The generating of an event response is preferably initiated by a usage event, such as passing a threshold based on the usage model, but may alternatively be triggered through pattern detection or through any suitable form of triggering. A usage event and associated actions are preferably set when assigning a usage model but may alternatively be set by default. There may a plurality of possible usage events, and each one preferably is associated with specified way to generating an event response. In the variation where an application each event response preferably has a unique redirection URI leading to an application. The application is preferably redirected to a URI. The computing platform preferably operates by communicating with the application at a specified URI, and redirecting to a URI gives an application at that URI the ability to run and/or interact with the computing platform. The URI is preferably defined by a developer of the application, a parent account holder, the computing platform, or any suitable entity. A default URI may alternatively be used. The URI preferably includes a script or program to perform the desired action of the account holder or parent-account holder as shown in FIG. 6. In one example, when an account nears a usage limit, a HTTP POST to a URI preferably initiates sending a billing reminder to the account holder. In other variations, the event response is performed from an internal module without any redirection to an external URI. The redirection may be performed serially or in parallel with operation of the application. A serial operation preferably interrupts call flow by the application (i.e., takes control of the application instance) and performs some action as shown in FIG. 6. The regular application may regain application control at the end of the action, or the application may terminate. For example, a serial operation may interrupt a phone call after the usage limit is passed; an audio message is played that informs the listener of surpassed usage; and then call ends. A parallel operation preferably performs some action concurrently during regular application control flow as shown in FIG. 7. A parallel operation preferably performs in the background. For example, a parallel operation may send a message to a server that sends a notification email to the sub-account holder.

Figure 8:
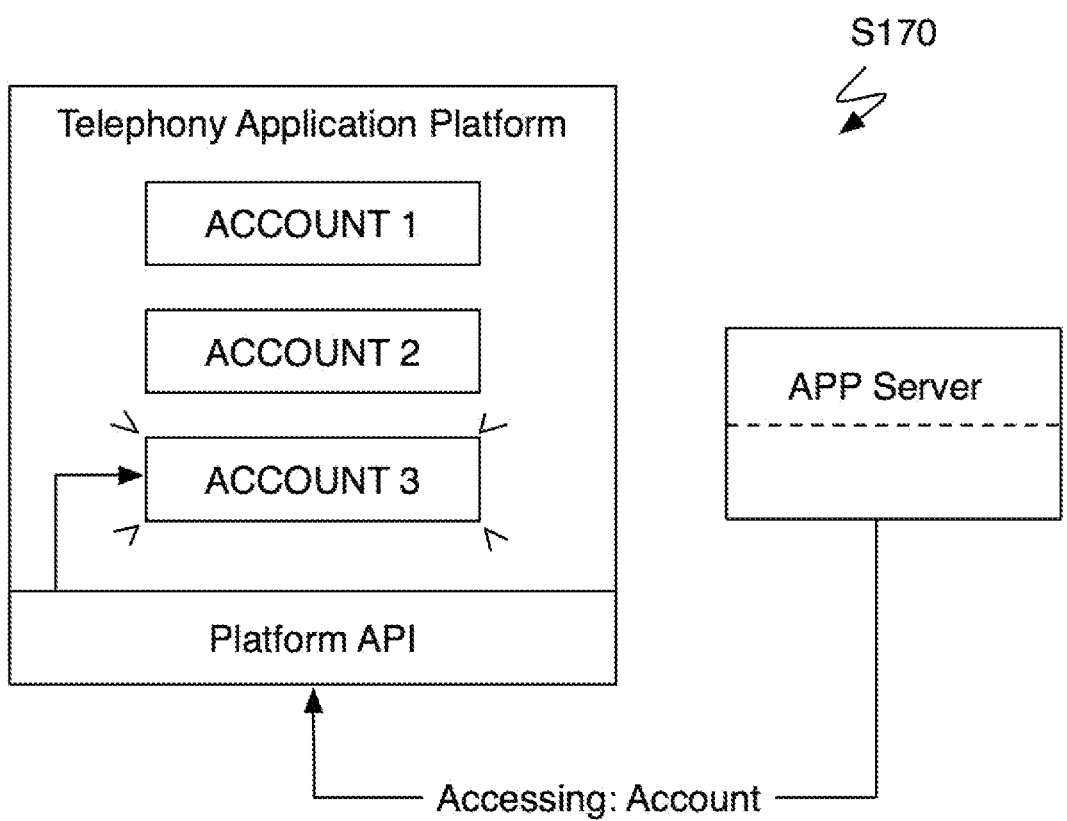
FIG. 8 is a detailed schematic representation of accessing account information of a preferred embodiment.

As shown in FIG. 8, the method may additionally include accessing account information S170, which functions to enable programmatically interacting with account and sub-account resources. Accessing account information is preferably programmatically performed through the platform API to monitor, retrieve, and/or set account and sub-account details. Overall usage information of an account can preferably be retrieved. Preferably any settings of the account are preferably controllable through the platform API. For example, a usage model can preferably be assigned. The platform API is preferably substantially similar to the platform API described above, and is preferably a REST API.

3. Method for Monitoring Sub-accounts on a Platform

Figure 9:
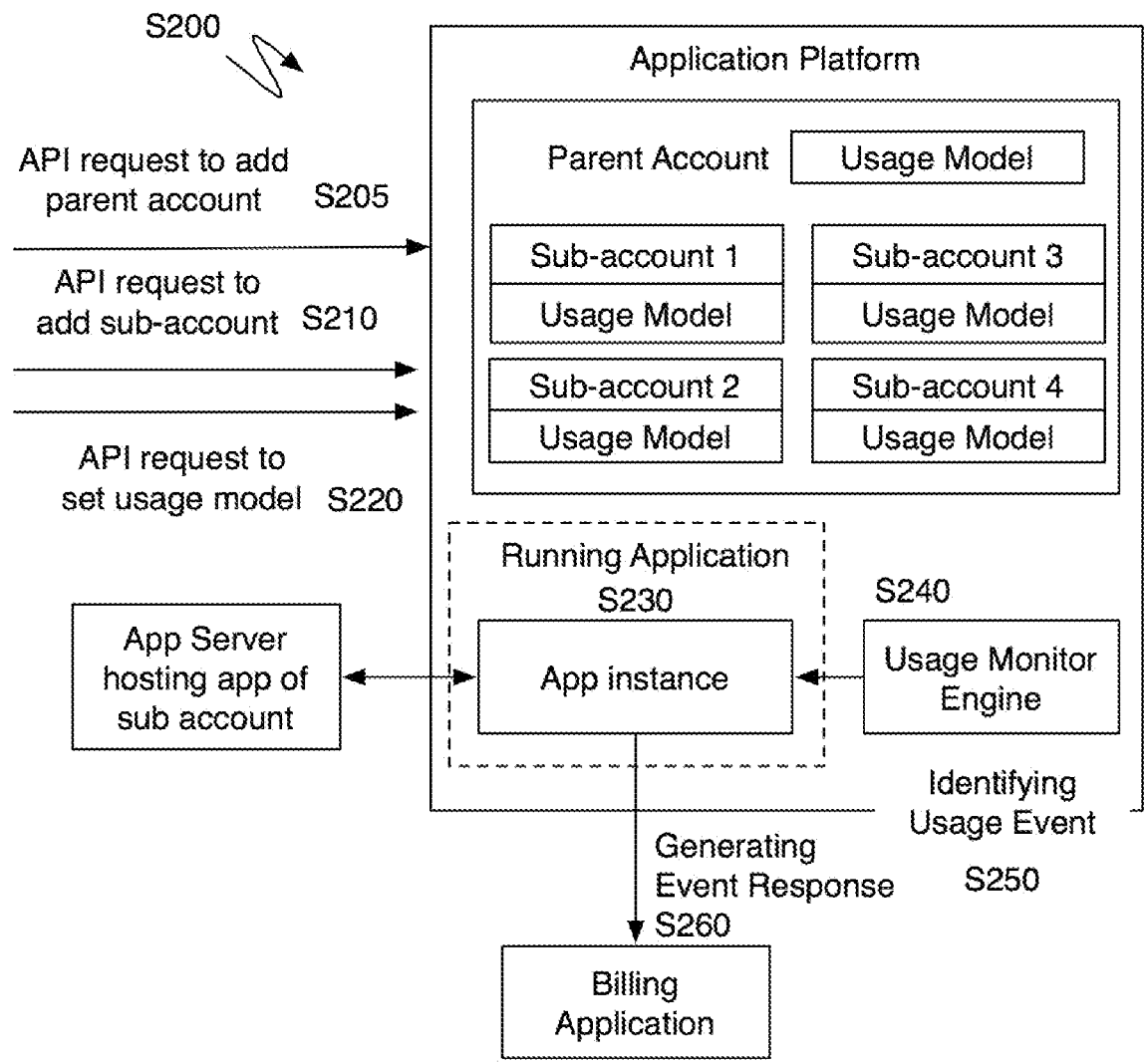
FIGS. 9 and 10 are schematic representations of a method of a preferred embodiment.
Figure 10:
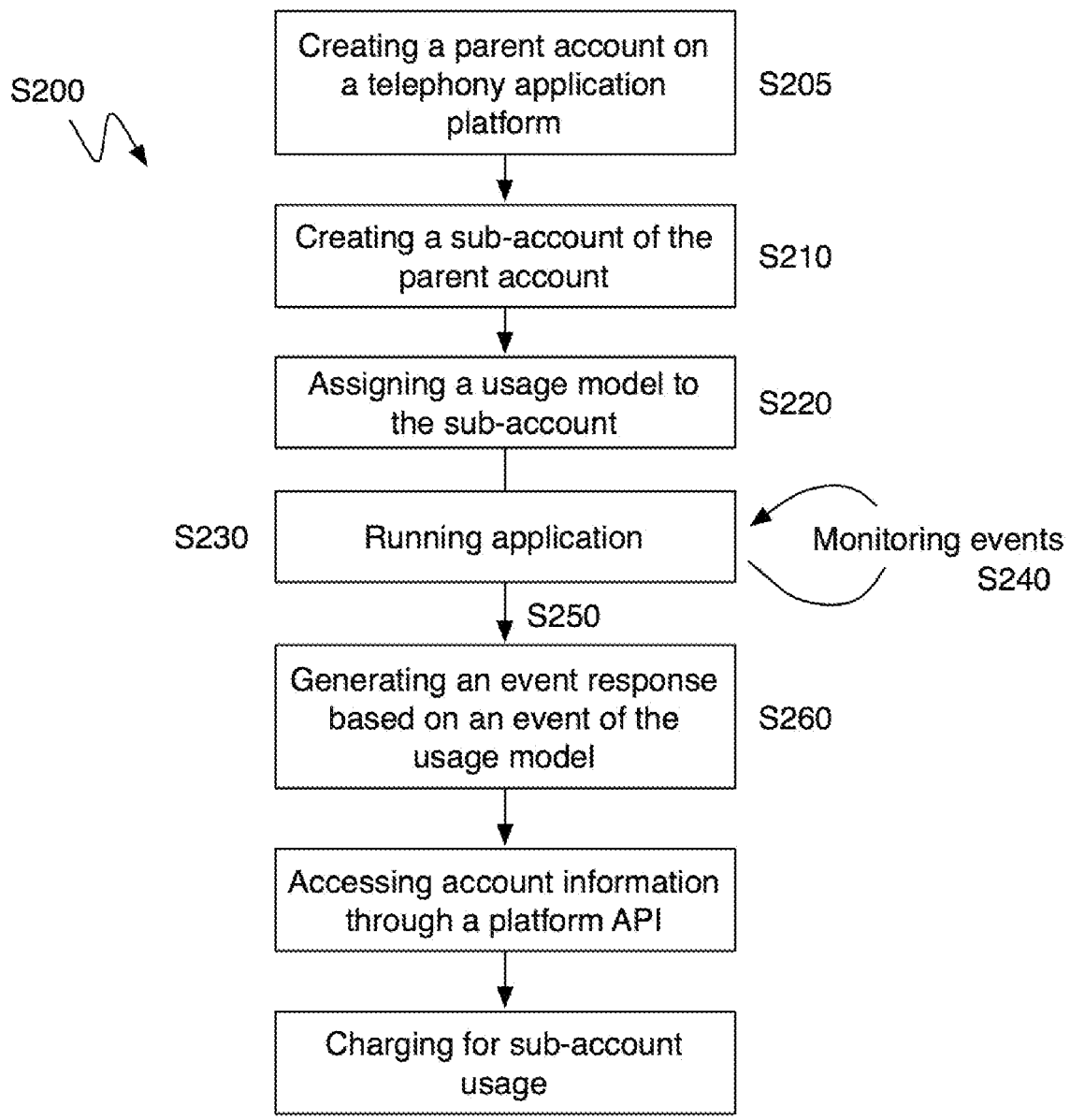
Figure 11:
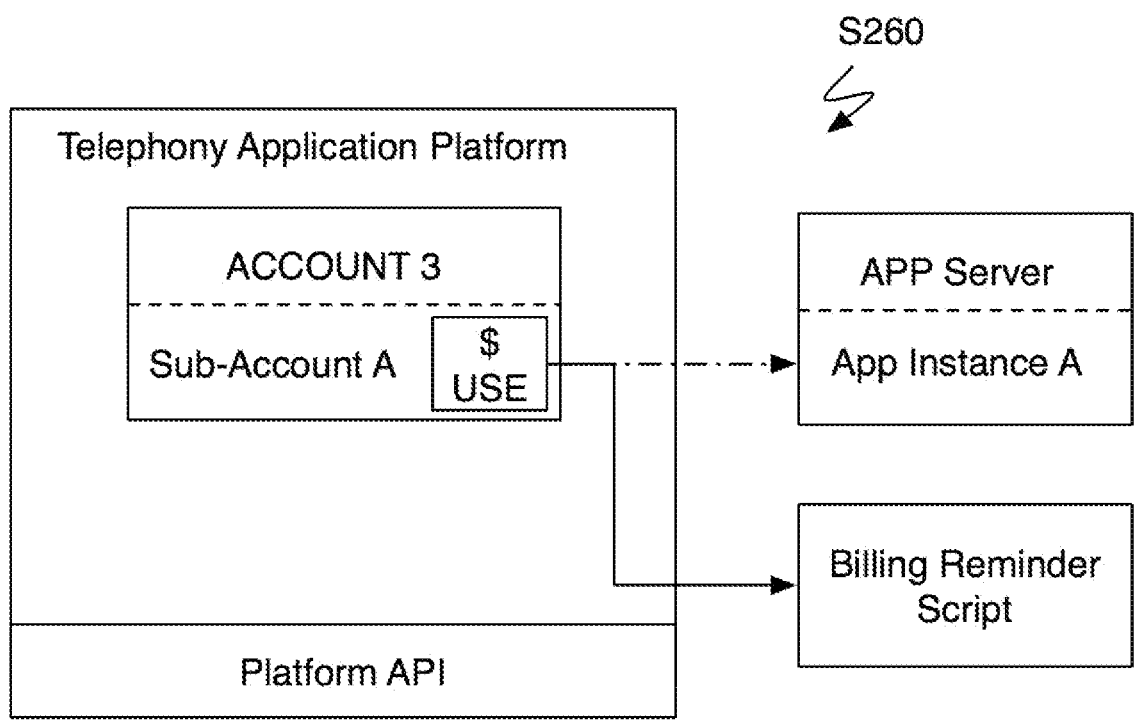
FIG. 11 is an exemplary schematic representation of redirecting a sub-account of a preferred embodiment.

As shown in FIGS. 9 and 10, a method S200 of a preferred embodiment preferably includes the steps creating a parent account on an application platform S205, creating a sub-account of the parent account S210, assigning a usage model to the sub-account S220, running an application of the sub-account on the platform S230, monitoring usage of the application of the sub-account S240; identifying a usage event of the usage model in the monitored usage S250; and generating an event response based on an event of the usage model S260. The method functions to enable an application to be developed by an account holder and instantiated in various sub-accounts. The method further functions to alleviate parent account holders from managing usage of sub-accounts on the telephony application platform. The method can preferably be adjusted to initiate any suitable action when redirecting. In one preferred variation, the method functions to simplify the billing of telephony application users or create billing notifications. The method is preferably used to implement a reselling environment for a telephony application platform, but may be used for any suitable alternative application. An instance of an application of the parent account is preferably used by the sub-account. Additionally, the parent account may have several applications from which a sub-account may select one or more. The method S200 is preferably substantially similar to method S100 except as noted below. In particular, Steps S210, S220, S230, S240, S250, and S260 are sustainably similar to Steps S110, S120, S130, S140, S150, and S160. The sub-accounts of S200 are preferably substantially similar to the accounts of S100. For example, as shown in FIG. 11, a sub-account may be redirected for billing of telephony application users, creating billing notifications, and/or performing any suitable usage based action. Sub-accounts preferably have a parent-account, which may be used to set some of the parameters, and may have control over the instance of the application used by the sub-account holder. Any suitable combination of additional steps or variations of S100 and S200 may be used.

Step S205, which includes creating a parent account on a telephony application platform, functions to define a main account used by a developer for managing an application and customers using the application. The parent account is preferably created by an entity that will manage the applications and sub-accounts. The parent account preferably defines the application(s) settings for sub-accounts. Creating a parent account preferably includes assigning a usage model for the parent account. The usage model of the parent account is preferably the rate at which the computing platform (e.g., a telephony application platform) earns revenue as described below. The usage model may be based on any suitable parameters of use such as call session time, number of telephony messages, data access, usage periods (e.g., unlimited for a month), rate limits (e.g., maximum number of simultaneous calls or number of calls per day), or any suitable parameter. Additionally, the parent account usage model can have partitions of rates for different sub-accounts. For example, one type of sub-account may have lower use (e.g., low volume of calls) so a different usage model is preferably used, while a second type of sub-account uses lots of resources (e.g., a high volume of calls) so a different usage model is preferably used for this type of sub-account. Any suitable revenue model may alternatively be used. The usage of the parent account and any sub-accounts is preferably counted as usage by the parent account. The parent account is preferably created through a web interface, but may alternatively be created through a platform API substantially similar to the platform API described for the system above. The account preferably defines authentication parameters for which a parent account holder can programmatically interface with the telephony application platform, such as when creating sub-accounts or configuring an application.

In Step S220, which includes assigning a usage model to the sub-account S220, functions to assign a specific usage model to a sub-account of a parent account. The parent account may have a plurality of sub-accounts, and each sub-account may have a unique usage model. The parent account can set a usage model for a sub-account. In one variation, a sub-account holder determines parameters of the usage model through a configuration application of the parent account holder. The configuration application preferably communicates the usage model parameters to the computing platform through an API to assign a usage model to the sub-account. Alternatively, a sub-account holder may set the usage model directly through any suitable means such as a user interface. A usage model of a sub-account preferably accounts for the use of application/service of the account holder and of the telephony application platform. The usage model of the account is preferably different from the account, but may be a substantially similar usage model as the account. Typically, the usage model of a sub-account has a higher price rate for the combined use of the telephony application platform and the application/service of the account holder. The usage model may alternatively cover just the usage cost of the telephony application platform or even subsidize the use of the telephony application platform, such as if the account generates revenue through different means.

S200 may additionally include accessing account information S270, which functions to enable programmatically interacting with parent account and sub-account resources. This is preferably substantially similar to Step S170 described above. Accessing account information is preferably programmatically performed through the platform API to monitor, retrieve, and/or set account and sub-account details. Overall usage information of a parent account can preferably be retrieved. Information for sub-accounts may alternatively be retrieved. Preferably any settings of the parent account or sub-account are preferably controllable through the platform API. The platform API is preferably substantially similar to the platform API described above, and is preferably a REST API.

Figure 12:
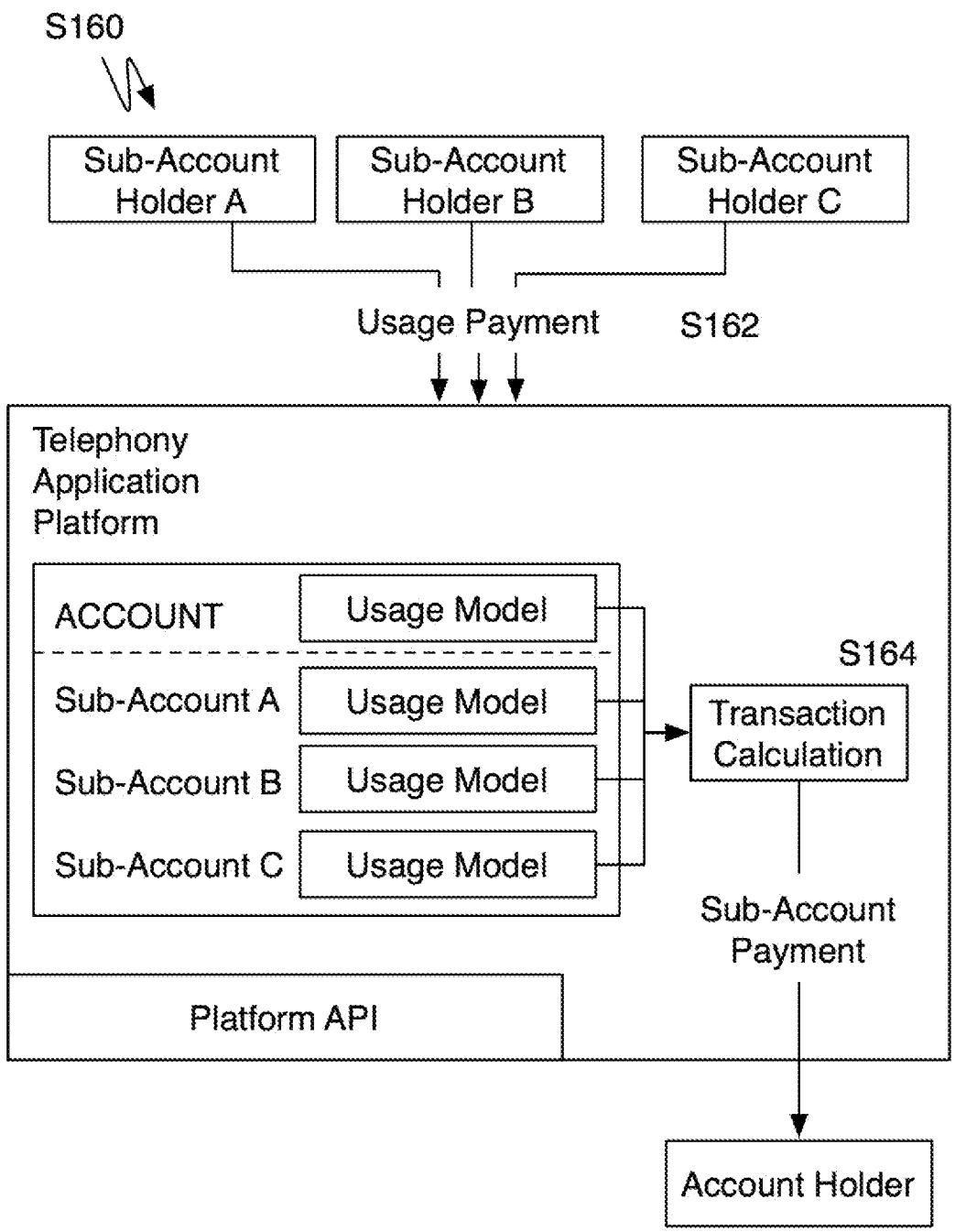
FIG. 12 is a detailed schematic representation of charging for sub-account usage of a preferred embodiment.

As shown in FIG. 12, the method may additionally include charging for sub-account usage S280, which functions to reduce billing complexity of an application platform. Step S280 additionally functions to create a centralized and automated billing process so that holders of accounts preferably do not manage bill collection from sub-account holders and paying computing platform operators for usage of the parent account. The computing platform preferably automates the billing process and usage tracking such that the account holder and sub-account holders are endpoints of transaction, and the telephony application platform preferably acts as a middle man. Step S280 preferably includes setting a telephony application platform usage model for an account holder, charging sub-accounts for usage plans S282, and completing a transaction with the parent account by factoring sub-account usage rates and parent account usage rates S284. The setting of a computing platform usage model for a parent account holder is preferably performed in Step S205, but may be performed at any suitable time. The computing platform preferably collects funds from sub-account holders. The computing platform may alternatively interface with an account holder system for charging the sub-accounts. Interfacing with an account holder system preferably enables a customer (i.e., sub-account holder) to interface only with the parent account holder. An oauth system or any suitable authentication service is preferably used to automate charging a sub-account through an outside application such as one managed by the parent account manager. This preferably functions to create the appearance of a parent account holder managing billing of a sub-account holder, but the telephony application platform preferably manages the calculations. When completing a transaction with a parent account holder, there may be a number of different situations depending on the usage model of the parent account and the sub-account. In one situation where a sub-account usage model has a higher price rate than the usage model of the parent account holder, an appropriate portion of money collected from the sub-account holders is preferably transferred to the account holder. The telephony app platform preferably withholds a portion of revenue for providing the telephony app platform, which is preferably determined by the parent account usage model. In another situation where the parent account holder sets the usage model of the sub-accounts at a lower price rate (or even free use of the telephone application/service), the parent account holder is preferably charged for the resource use of all sub-accounts according to the usage model of the parent account holder. This variation may occur if the application/service provided by the account holder made revenue in some other fashion such as through ad revenue.

An alternative embodiment preferably implements the above methods in a computer-readable medium storing computer-readable instructions. The instructions are preferably executed by computer-executable components preferably integrated with a computing platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
   receiving, by a communication platform system, an incoming communication from a client device, the incoming communication being addressed to a first endpoint managed by the communication platform system, wherein the first endpoint is assigned to a first sub-account of a parent account and the first endpoint is mapped to a first instance of an application associated with the parent account;
   in response to the receiving of the incoming communication, accessing, by the communication platform system, a uniform resource identifier (URI) that identifies a computing resource that provides the first instance of the application, the computing resource being external to the communication platform system;
   transmitting, by the communication platform system, a request addressed to the accessed URI to retrieve a set of instructions from the computing resource;
   executing, by the communication platform system, the set of instructions to enable an interaction between the client device and the first instance of the application;
   determining that execution of an event response specified by a first sub-account usage model has been triggered;
   transmitting a second request addressed to a second URI to retrieve a second set of instructions;
   causing an interruption of the interaction between the client device and the first instance of the application;
   executing the second set of instructions to play a recording to the client device as part of the event response during the interruption;
   tracking usage of the computing resources provided by the communication platform system resulting from the interaction between the client device and the first instance of the application; and
   performing a transfer between an account of an operator of the communication platform system and an account of an entity associated with the parent account, an amount of the transfer being based on usage of the computing resources by the parent account offset by the usage of the computing resources provided by the communication platform system resulting from the interaction between the client device and the first instance of the application.

2. The method of claim 1, wherein determining that execution of the event response specified by the first sub-account usage model has been triggered comprises:
   determining that a threshold specified in the first sub-account usage model has been met.

3. The method of claim 1, wherein determining that execution of the event response specified by the first sub-account usage model has been triggered comprises:
   determining that a usage pattern specified in the first sub-account usage model has occurred.

4. The method of claim 1, wherein executing the event response comprises:
   adjusting billing data for the first sub-account based on usage of the first instance of the application.

5. The method of claim 1, further comprising:
   after completion of the event response, reestablishing the interaction between the client device and the first instance of the application.

6. The method of claim 1, further comprising:
   receiving, by the communication platform system, an additional incoming communication from the client device or an additional client device, the additional incoming communication being addressed to a second endpoint managed by the communication platform system, wherein the second endpoint is assigned to a second sub-account of the parent account and the second endpoint is mapped to a second instance of the application associated with the parent account, wherein the amount of the transfer is further based on the usage of computing resources provided by the communication platform system resulting from an additional interaction between the client device or the additional client device and the second instance of the application.

7. A communication platform system comprising:
   one or more computer processors; and
   one or more computer-readable mediums storing instructions that, when executed by the one or more computer processors, cause the communication platform system to perform operations comprising:
receiving an incoming communication from a client device, the incoming communication being addressed to a first endpoint managed by the communication platform system, wherein the first endpoint is assigned to a first sub-account of a parent account and the first endpoint is mapped to a first instance of an application associated with the parent account;
in response to the receiving of the incoming communication, accessing a uniform resource identifier (URI) that identifies a computing resource that provides the first instance of the application, the computing resource being external to the communication platform system;
transmitting a request addressed to the accessed URI to retrieve a set of instructions from the computing resource;
executing the set of instructions to enable an interaction between the client device and the first instance of the application;
determining that execution of an event response specified by a first sub-account usage model has been triggered;
transmitting a second request addressed to a second URI to retrieve a second set of instructions;
causing an interruption of the interaction between the client device and the first instance of the application;
executing the second set of instructions to play a recording to the client device as part of the event response during the interruption;
tracking usage of the computing resources provided by the communication platform system resulting from the interaction between the client device and the first instance of the application; and
performing a transfer between an account of an operator of the communication platform system and an account of an entity associated with the parent account, an amount of the transfer being based on usage of the computing resources by the parent account offset by the usage of the computing resources provided by the communication platform system resulting from the interaction between the client device and the first instance of the application.

8. The communication platform system of claim 7, wherein determining that execution of the event response specified by the first sub-account usage model has been triggered comprises:
determining that a threshold specified in the first sub-account usage model has been met.

9. The communication platform system of claim 7, wherein determining that execution of the event response specified by the first sub-account usage model has been triggered comprises:
determining that a usage pattern specified in the first sub-account usage model has occurred.

10. The communication platform system of claim 7, wherein executing the event response comprises:
adjusting billing data for the first sub-account based on usage of the first instance of the application.

11. The communication platform system of claim 7, the operations further comprising:
receiving an additional incoming communication from the client device or an additional client device, the additional incoming communication being addressed to a second endpoint managed by the communication platform system, wherein the second endpoint is assigned to a second sub-account of the parent account and the second endpoint is mapped to a second instance of the application associated with the parent account, wherein the amount of the transfer is further based on the usage of computing resources provided by the communication platform system resulting from an additional interaction between the client device or the additional client device and the second instance of the application.

12. The communication platform of claim 7, the operations further comprising:
after completion of the event response, reestablishing the interaction between the client device and the first instance of the application.

13. A non-transitory computer-readable medium storing instructions that, when executed by one or more computer processors of a communication platform system, cause the communication platform system to perform operations comprising:
receiving an incoming communication from a client device, the incoming communication being addressed to a first endpoint managed by the communication platform system, wherein the first endpoint is assigned to a first sub-account of a parent account and the first endpoint is mapped to a first instance of an application associated with the parent account;
in response to the receiving of the incoming communication, accessing a uniform resource identifier (URI) that identifies a computing resource that provides the first instance of the application, the computing resource being external to the communication platform system;
transmitting a request addressed to the accessed URI to retrieve a set of instructions from the computing resource;
executing the set of instructions to enable an interaction between the client device and the first instance of the application;
determining that execution of an event response specified by a first sub-account usage model has been triggered;
transmitting a second request addressed to a second URI to retrieve a second set of instructions;
causing an interruption of the interaction between the client device and the first instance of the application;
executing the second set of instructions to play a recording to the client device as part of the event response during the interruption;
tracking usage of the computing resources provided by the communication platform system resulting from the interaction between the client device and the first instance of the application; and
performing a transfer between an account of an operator of the communication platform system and an account of an entity associated with the parent account, an amount of the transfer being based on usage of the computing resources by the parent account offset by the usage of the computing resources provided by the communication platform system resulting from the interaction between the client device and the first instance of the application.

14. The non-transitory computer-readable medium of claim 13, wherein determining that execution of the event response specified by the first sub-account usage model has been triggered comprises:
determining that a threshold specified in the first sub-account usage model has been met.

15. The non-transitory computer-readable medium of claim 13, wherein determining that execution of the event response specified by the first sub-account usage model has been triggered comprises:
   determining that a usage pattern specified in the first sub-account usage model has occurred.

16. The non-transitory computer-readable medium of claim 13, wherein executing the event response comprises:
   adjusting billing data for the first sub-account based on usage of the first instance of the application.

17. The non-transitory computer-readable medium of claim 13, the operations further comprising:
   receiving an additional incoming communication from the client device or an additional client device, the additional incoming communication being addressed to a second endpoint managed by the communication platform system, wherein the second endpoint is assigned to a second sub-account of the parent account and the second endpoint is mapped to a second instance of the application associated with the parent account, wherein the amount of the transfer is further based on the usage of computing resources provided by the communication platform system resulting from an additional interaction between the client device or the additional client device and the second instance of the application.

18. The non-transitory computer-readable medium of claim 13, the operations further comprising:
   after completion of the event response, reestablishing the interaction between the client device and the first instance of the application.

* * * * *

UNITED STATES PATENT AND TRADEMARK OFFICE
CERTIFICATE OF CORRECTION

PATENT NO. : 11,637,934 B2
APPLICATION NO. : 16/704681
DATED : April 25, 2023
INVENTOR(S) : Lawson et al.

It is certified that error appears in the above-identified patent and that said Letters Patent is hereby corrected as shown below:

On the Title Page

On page 5, in Column 2, under item (56) "U.S. Patent Documents", Line 8, delete "2009/0022131" and insert --2009/0221310-- therefor On page 5, in Column 2, under item (56) "U.S. Patent Documents", Line 54, delete "2010/0029191" and insert --2010/0291910-- therefor On page 5, in Column 2, under item (56) "U.S. Patent Documents", Line 70, delete "2011/0014981" and insert --2011/0149810-- therefor On page 6, in Column 1, under item (56) "U.S. Patent Documents", Line 44, delete "2012/0017361" and insert --2012/0173610-- therefor On page 6, in Column 2, under item (56) "U.S. Patent Documents", Line 45, delete "2014/0037251" and insert --2014/0372510-- therefor Signed and Sealed this
Thirteenth Day of August, 2024

Katherine Kelly Vidal
*Director of the United States Patent and Trademark Office*